US012714258B2

(12) United States Patent
Wang et al.

(10) Patent No.: US 12,714,258 B2
(45) Date of Patent: Aug. 25, 2026

(54) SANDWICH MAKER

(71) Applicant: PRESIDENT CHAIN STORE CORP., Taipei City (TW)

(72) Inventors: Fei-Chen Wang, Taipei City (TW); I-Ting Chang, Taipei City (TW); Shyh-Harn Huang, Taipei City (TW)

(73) Assignee: PRESIDENT CHAIN STORE CORP., Taipei City (TW)

( * ) Notice: Subject to any disclaimer, the term of this patent is extended or adjusted under 35 U.S.C. 154(b) by 1063 days.

(21) Appl. No.: 17/024,886

(22) Filed: Sep. 18, 2020

(65) Prior Publication Data

US 2022/0039594 A1 Feb. 10, 2022

(30) Foreign Application Priority Data

Aug. 4, 2020 (TW) ................................ 109210077

(51) Int. Cl.
*A47J 37/06* (2006.01)
*A23P 20/20* (2016.01)
(Continued)

(52) U.S. Cl.
CPC ........... *A47J 37/0611* (2013.01); *A23P 20/20* (2016.08); *A23P 30/10* (2016.08); *A47J 2037/0617* (2013.01); *A47J 37/08* (2013.01)

(58) Field of Classification Search
CPC ............................ A47J 37/0611; A47J 37/08; A47J 2037/0617; A23P 20/20; A23P 30/10
See application file for complete search history.

(56) References Cited

U.S. PATENT DOCUMENTS 3,776,124 A * 12/1973 Morley ................ A47J 37/0611 99/335
5,555,793 A * 9/1996 Tocchet .................. G07F 9/105 99/357

(Continued)

FOREIGN PATENT DOCUMENTS

CN 209684736 U * 11/2019 ............. B65G 47/52
CN 210471932 U * 5/2020

(Continued)

OTHER PUBLICATIONS

Written Opinion on Registration of App. No. 10-2020-0114315, Dec. 28, 2021, Korean Intellectual Property Office (Year: 2021).*

(Continued)

*Primary Examiner* — Woody A Lee, Jr.
*Assistant Examiner* — Abigail H Rhue
(74) *Attorney, Agent, or Firm* — MUNCY, GEISSLER, OLDS & LOWE, P.C.

(57) ABSTRACT

A sandwich maker is provided, including a support structure, a pressing mechanism, a hot-pressing structure, a bearing structure, a conveying mechanism, and a controller. The pressing mechanism includes a first motor set, a first transmission rod, and a connecting base, where the connecting base performs linear reciprocating motion along a first direction driven by the first motor set and the first transmission rod. The hot-pressing structure includes a heating device and a pressing mold. The pressing mold has a first mold cavity. The bearing structure includes a heating furnace and a bearing mold. The bearing mold has a second mold cavity. The conveying mechanism includes a second motor, a second transmission rod, and a conveying base, where the conveying base performs linear reciprocating motion along a second direction driven by the second motor (Continued)

and the second transmission rod. The controller controls operation of the sandwich maker.

8 Claims, 6 Drawing Sheets

(51) Int. Cl.
*A23P 30/10* (2016.01)
*A47J 37/08* (2006.01)

(56) References Cited

U.S. PATENT DOCUMENTS 7,444,928 B2 * 11/2008 Kim .......................... A23L 7/187
99/349
2021/0378445 A1 * 12/2021 Nandoliya .......... F24C 15/2042

FOREIGN PATENT DOCUMENTS

CN 211251058 U * 8/2020
EP 3434105 A1 * 1/2019 ............... A21B 3/18
KR 200361869 Y1 * 9/2004
KR 200453377 Y1 * 4/2011

OTHER PUBLICATIONS

Front definition, 2023, Cambridge English Dictionary (Year: 2023).*
Christa Carey, Ventilation Options for Your Custom Enclosure, Apr. 2, 2018, Electronic Products & Technology (Year: 2018).*
Machine translation of CN-209684736: "Pan, A hot pressing loading and unloading equipment, 2019" (Year: 2019).*
Machine translation of CN-211251058: Guan, Hot Press, 2019 (Year: 2019).*

* cited by examiner

SANDWICH MAKER

CROSS-REFERENCE TO RELATED APPLICATION

This non-provisional application claims priority under 35 U.S.C. § 119(a) to Patent Application No. 109210077 filed in Taiwan, R.O.C. on Aug. 4, 2020, the entire contents of which are hereby incorporated by reference.

BACKGROUND

Technical Field

The present invention relates to a pastry machine, and in particular, to a sandwich maker.

Related Art

A sandwich maker is a very common pastry machine at present. Through design of a mold cavity in a hot-pressing structure and a bearing structure, various creative dishes are formed by the sandwich maker.

Generally, the sandwich maker in the market mainly performs hot pressing on a food material placed in the mold cavity through rotating a hot-pressing structure and a bearing structure pivotally connected to each other from a separated state to a combined state. However, the sandwich maker in the market may only manually place the food material into the mold cavity, and the hot-pressing structure and the bearing structure are driven by power manually to perform hot pressing.

SUMMARY

In view of the foregoing, in an embodiment, a sandwich maker is provided, including a support structure, a pressing mechanism, a hot-pressing structure, a bearing structure, a conveying mechanism, and a controller. The pressing mechanism is disposed on the support structure and includes a first motor set, a first transmission rod, and a connecting base, where the first transmission rod is connected to the first motor set, the connecting base is connected to the first transmission rod, and the connecting base performs linear reciprocating motion driven by the first motor set and the first transmission rod. The hot-pressing structure is fixed to the connecting base and includes a heating device and a pressing mold, where the pressing mold is connected to the connecting base, the heating device is disposed between the connecting base and the pressing mold, and the pressing mold has a first mold cavity. The bearing structure is fixed to the support structure, where the bearing structure includes a heating furnace and a bearing mold, the heating furnace being correspondingly disposed below the hot-pressing structure, and the bearing mold being disposed above the heating furnace and having a second mold cavity. The conveying mechanism includes a second motor, a second transmission rod, and a conveying base, where the second motor is fixed to the support structure, the second transmission rod is connected to the second motor, the conveying base is connected to the second transmission rod and performs linear reciprocating motion along a second direction driven by the second motor and the second transmission rod, the first direction being perpendicular to the second direction. The controller is disposed on the support structure and electrically connected to the first motor set, the second motor, the heating device, and the heating furnace to control operation of the first motor set, the second motor, the heating device, and the heating furnace.

In summary, the sandwich maker of the present invention controls, by using the controller, the second motor in the conveying mechanism to drive the second transmission rod to drive the conveying base to perform linear motion, so that a to-be-heated food material (such as toast) is conveyed the inside of the sandwich maker. Next, the controller controls the first motor set to drive the pressing mechanism to drive the hot-pressing structure to move toward the bearing structure, and press the heat-pressing structure to be engaged with the bearing structure, and control the operation of the heating device and the heating furnace, so that the sandwich maker is operated and performs hot pressing fully automatically. In this way, after the food material is placed in the conveying base and started, the sandwich maker automatically performs hot pressing, achieving automation and humanization.

DETAILED DESCRIPTION

Figure 1:
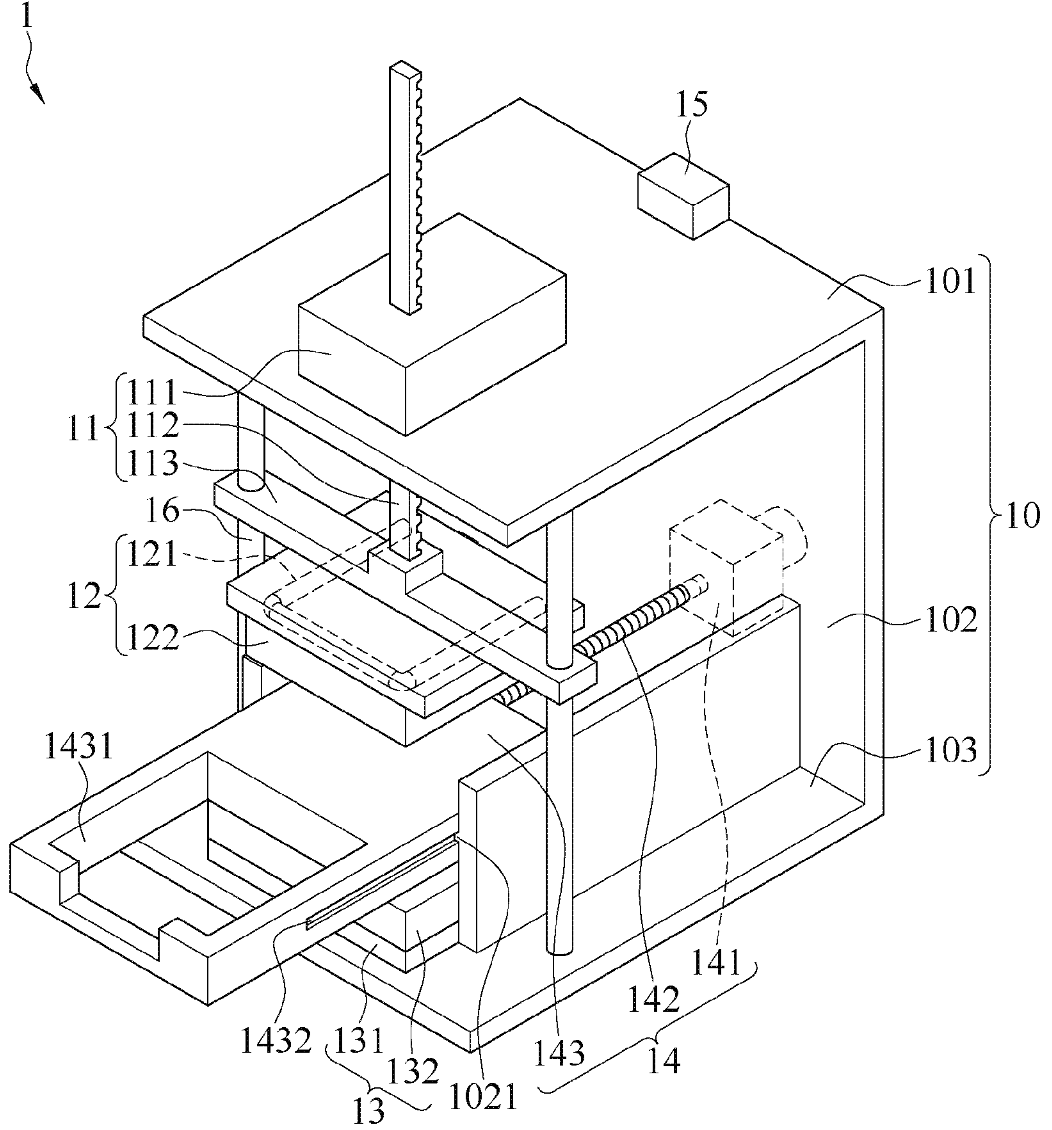
FIG. 1 is a three-dimensional view of a sandwich maker with a housing omitted according to an embodiment of the present invention.

The following provides detailed descriptions of various embodiments. However, the embodiments are merely used as an example for description and are not intended to narrow the protection scope of this creation. In addition, some elements may be omitted in the drawings in the embodiments, to clearly show technical features of this creation. The same label in all accompanying drawings are used to represent the same or similar elements.

Figure 2:
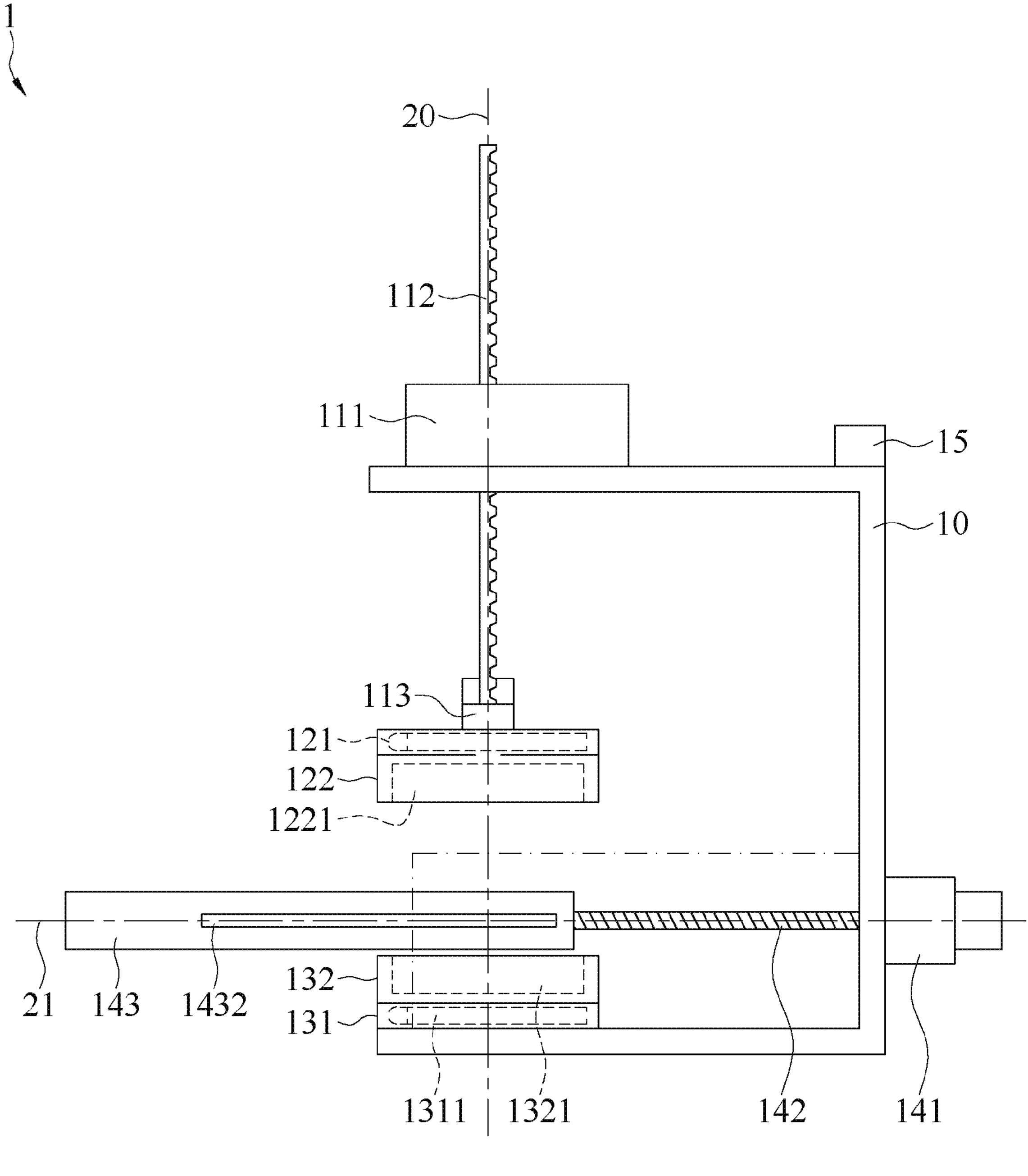
FIG. 2 is a partial side view of movement of the sandwich maker to an initial position according to an embodiment of the present invention.

FIG. 1 is a three-dimensional view of a sandwich maker with a housing omitted according to an embodiment of the present invention. FIG. 2 is a partial side view of movement of the sandwich maker to an initial position according to an embodiment of the present invention. A sandwich maker 1 performs hot pressing on a food material by pressing up and down, so that a general user may quickly heat and make a variety of delicious creative hot-pressed toasts in a simple and rapid manner.

As shown in FIG. 1 and FIG. 2, the sandwich maker 1 includes a support structure 10, a pressing mechanism 11, a hot-pressing structure 12, a bearing structure 13, a conveying mechanism 14, and a controller 15. In FIG. 1 and FIG. 2, a physical connection relationship between each element and the controller 15 is omitted to facilitate description of an overall structure. The controller 15 may be electrically connected to the first motor set 111, the second motor 141, the heating device 121, and the heating furnace 131 through cables and wires, etc., to control operation of the first motor set 111, the second motor 141, the heating device 121, and the heating furnace 131.

Still referring to FIG. 1 and FIG. 2, the pressing mechanism 11 of the sandwich maker 1 is disposed on the support structure 10, and the pressing mechanism 11 includes the first motor set 111, a first transmission rod 112, and a connecting base 113. The first transmission rod 112 is connected to the first motor set 111, the connecting base 113 is connected to the first transmission rod 112, and the connecting base 113 performs linear reciprocating motion along a first direction 20 driven by the first motor set 111 and the first transmission rod 112.

In this embodiment, the first motor set 111 includes a motor and a speed reducing mechanism (not shown). A motor of the first motor set 111 may be a DC motor or an AC motor, and a rotating shaft of the first motor set is connected to the speed reducing mechanism formed by a gear set, and the first transmission rod 112 is in a form of a rack and is connected to the speed reducing mechanism. A lower side end of the first transmission rod 112 is locked with the connecting base 113. By disposing the foregoing mechanism, the connecting base 113 may perform linear reciprocating motion along an axial direction of the first transmission rod 112 driven by the first motor set 111 and the first transmission rod 112. In this embodiment, the axial direction of the first transmission rod 112 is a first direction 20.

In addition, in some embodiments, the first motor set 111 may further be a linear motor, and a stator of the first motor set is fixedly mounted to the support structure 10 through bolts, and a mover of the first motor set is connected to the first transmission rod 112. Through the foregoing configuration, a bidirectional axial force output by a linear motor is guided to be conveyed to the first transmission rod 112 and drive the connecting base 113 to perform linear reciprocating motion.

Next, still referring to FIG. 1 and FIG. 2, the hot-pressing structure 12 of the sandwich maker 1 is fixed to the connecting base 113. The hot-pressing structure 12 includes a heating device 121 and a pressing mold 122. The pressing mold 122 is connected to the connecting base 113, and the heating device 121 is disposed between the connecting base 113 and the pressing mold 122. In this embodiment, the pressing mold 122 may be fixed to the connecting base 113 in a bolt-locking manner, and the heating device 121 is, for example, a heating tube to be fixed between the connecting base 113 and the pressing mold 122 in a locking manner. The heating device 121 is electrically connected to the controller 15 to convert electrical energy into thermal energy, and conducts the thermal energy to the pressing mold 122 to cause the pressing mold 122 to generate a high temperature.

As shown in FIG. 2, the pressing mold 122 has a first mold cavity 1221. In this embodiment, a shape of the first mold cavity 1221 of the pressing mold 122 is a square. In some embodiments, the first mold cavity 1221 is a round, a pentagon, an octagon, or other arbitrary shapes, depending on what kind of a dish shape the user wants to make, and is set as needed. Alternatively, the pressing mold 122 with a replaceable shape is used for replacement as needed.

As shown in FIG. 1 and FIG. 2, the bearing structure 13 of the sandwich maker 1 is fixed to the support structure 10. The bearing structure 13 includes a heating furnace 131 and a bearing mold 132. The heating furnace 131 is correspondingly disposed below the hot-pressing structure 12, and the bearing mold 132 is disposed above the heating furnace 131 and has a second mold cavity 1321. In this embodiment, one side of the heating furnace 131 may be mounted on the support structure 10 through locking, and the other side may further be fixed to the bearing mold 132 through locking. The heating furnace 131 has a heater 1311 and is electrically connected to the controller 15 to convert electrical energy into heat energy, and conduct the heat energy to the bearing mold 132, so that the bearing mold 132 generates a high temperature.

In this embodiment, a shape of the second cavity 1321 of the bearing mold 132 is square. In some embodiments, the second mold cavity 1321 may be a round, a pentagon, an octagon, or other arbitrary shapes, etc., depending on what kind of a dish shape the user wants to make, and is set as needed. Alternatively, a bearing mold 132 with a replaceable shape is used for replacement as needed.

As shown in FIG. 1 and FIG. 2, the conveying mechanism 14 of the sandwich maker 1 includes a second motor 141, a second transmission rod 142, and a conveying base 143. The second motor 141 is fixed to the support structure 10, the second transmission rod 142 is connected to the second motor 141, and the conveying base 143 is connected to the second transmission rod 142. The conveying base 143 performs linear reciprocating motion along a second direction 21 driven by the second motor 141 and the second transmission rod 142. An implementation used in this embodiment is detailed later. However, in some embodiments, the second motor 141 may be a linear motor, a stator of the second motor is locked on the support structure 10, and a mover of the second motor is connected to the second transmission rod 142. The conveying base 143 performs linear reciprocating motion along an axial direction of the second transmission rod 142 driven by the second motor 141 and the second transmission rod 142.

Wherein the first direction 20 is perpendicular to the second direction 21, in this embodiment, the axial direction of the second transmission rod 142 is the second direction 21 and is perpendicular to the axial direction, that is, the first direction 20, of the first transmission rod 112.

Figure 3:
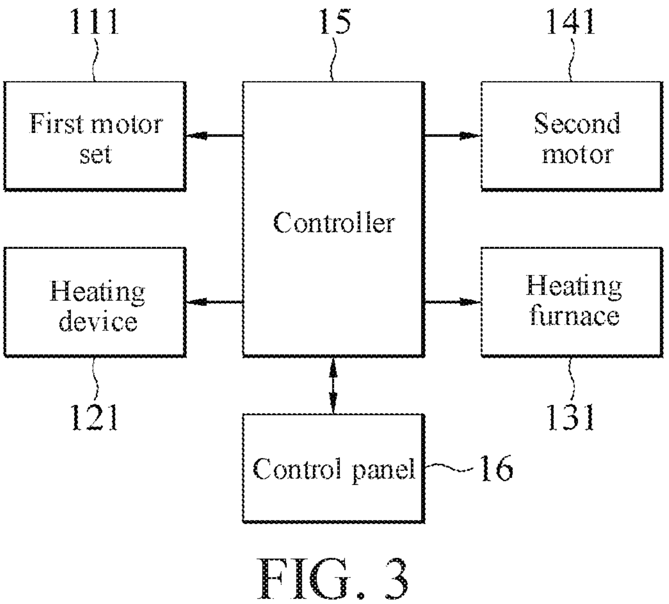
FIG. 3 is a control block diagram of the sandwich maker according to an embodiment of the present invention.

FIG. 3 is a control block diagram of the sandwich maker according to an embodiment of the present invention. As shown in FIG. 1 to FIG. 3, the controller 15 of the sandwich maker 1 may be disposed at any position on the support structure 10, as long as the controller 15 may facilitate miniaturization of an overall structure or facilitate connection of other elements. As previous described, the controller 15 is electrically connected to the first motor set 111, the second motor 141, the heating device 121, and the heating furnace 131 to control operation of the first motor set 111, the second motor 141, the heating device 121, and the heating furnace 131. For example, in this embodiment, the controller 15 controls the first motor set 111 to drive the pressing mechanism 11, and drive the hot-pressing structure 12 to move toward the bearing structure 13 and to be pressed to be engaged with the bearing structure 13. The controller 15 further controls the second motor 141 to drive the second transmission rod 142 to drive the conveying base 143 to perform linear reciprocating motion. In addition, the controller 15 may control heating of the heating device 121 and the heating furnace 131. Accordingly, the sandwich maker 1 may automatically perform hot pressing on a food material placed in the conveying base 143 in a non-manual manner, achieving product automation and humanization. In this embodiment, the controller 15 is a programmable automation controller (PAC). In some embodiments, the controller may further be a programmable logic controller (PLC), a micro controller (MCU), and other types of controllers.

Returning to FIG. 1 and FIG. 2, in this embodiment, the support structure 10 of the sandwich maker 1 includes a top cover 101, a receiving portion 102, and a base 103. The receiving portion 102 is located between the top cover 101 and the base 103, the first motor set 111 is fixed to the top cover 101, the heating furnace 131 is disposed on the base 103, and the second motor 141 is fixed to the receiving portion 102. In this embodiment, the top cover 101, the receiving portion 102, and the base 103 may be made of metal, such as stainless steel (SUS304), iron, cast iron, and aluminum, etc., through metal stamping or casting. In some embodiments, the top cover 101, the receiving portion 102, and the base 103 may further be made of plastic through injection molding, and then spliced in a fixing method such as bolt locking or riveting to form the support structure 10. In some embodiments, the support structure 10 may further be an integrally formed metal support structure through casting or an integrally formed plastic support structure through injection molding.

As shown in FIG. 1 and FIG. 2, the receiving portion 102 of the support structure 10 has a first guide structure 1021, the conveying base 143 includes a second guide structure 1432, and the second guide structure 1432 is engaged with the first guide structure 1021, so that the second guide structure 1432 performs linear motion under guidance of the first guide structure 1021. In this embodiment, a body of the second motor 141 is fixed to the support structure 10 by bolt locking, the second transmission rod 142 is a screw rod and is connected to the second motor 141, and the conveying base 143 is connected to the second transmission rod 142 by threaded engagement through an inner screw hole of the conveying base. The first guide structure 1021 is a sliding rail, and the second guide structure 1432 is a sliding groove. Through matching of the first guide structure 1021 and the second guide structure 1432, the conveying base 143 is guided to move along the second guide structure 1432, and rotational freedom of the conveying base 143 is restricted by the support structure 10. Therefore, through rotation output by the second motor 141 and conveyed to the second transmission rod 142, the second guide structure 1432 performs linear reciprocating motion under guidance of the first guide structure 1021, and the conveying base 143 further performs linear reciprocating motion along the second direction 21.

In some embodiments, the first guide structure 1021 may further be a sliding groove, and the second guide structure 1432 is a sliding rail.

As shown in FIG. 1 and FIG. 2, the sandwich maker 1 further includes two guide rods 16. The two guide rods 16 are fixed between the top cover 101 and the base 103 and are disposed in parallel with the first transmission rod 112. There are guide holes on both sides of the connecting base 113 to insert the connecting base 113 between the two guide rods 16, so that the connecting base 113 may only move along an axial direction of the connecting base 113 under restriction and guidance by the two guide rods 16. Guided by the two guide rods 16, the hot-pressing structure 12 performs the linear reciprocating motion more stably driven by the first motor set 111 and is positioned more accurately. For example, in this embodiment, the two guide rods 16 may be a rod of other shapes such as a metal round rod or a plastic round rod, and is fixed between the top cover 101 and the base 103 by bolt locking, riveting, welding, and adhesive dispensing. In this embodiment, lubricating oil may further be applied to a surface of the two guide rods 16 to reduce a friction coefficient and increase a service life of the product.

In addition, in some implementations, the pressing mechanism 11 may further be implemented in the following manners. A motor body of the first motor set 111 is mounted above the top cover 101, the rotating shaft passes downward through the top cover 101 and is connected to one end of the first transmission rod 112, and the other end of the first transmission rod 112 is threadedly engaged with the connecting base 113. In addition, there are guide holes on both sides of the connecting base 113 to insert the connecting base 113 between the two guide rods 16, so that the connecting base 113 may only move along an axial direction of the connecting base under restriction and guidance by the two guide rods 16. Through the foregoing restriction and guidance, rotation of the first motor set 111 is output, and is converted into an axial linear motion through threaded engagement of the connecting base 113 and the first transmission rod 112 to drive the connecting base 113 to perform linear reciprocating motion.

Figure 4:
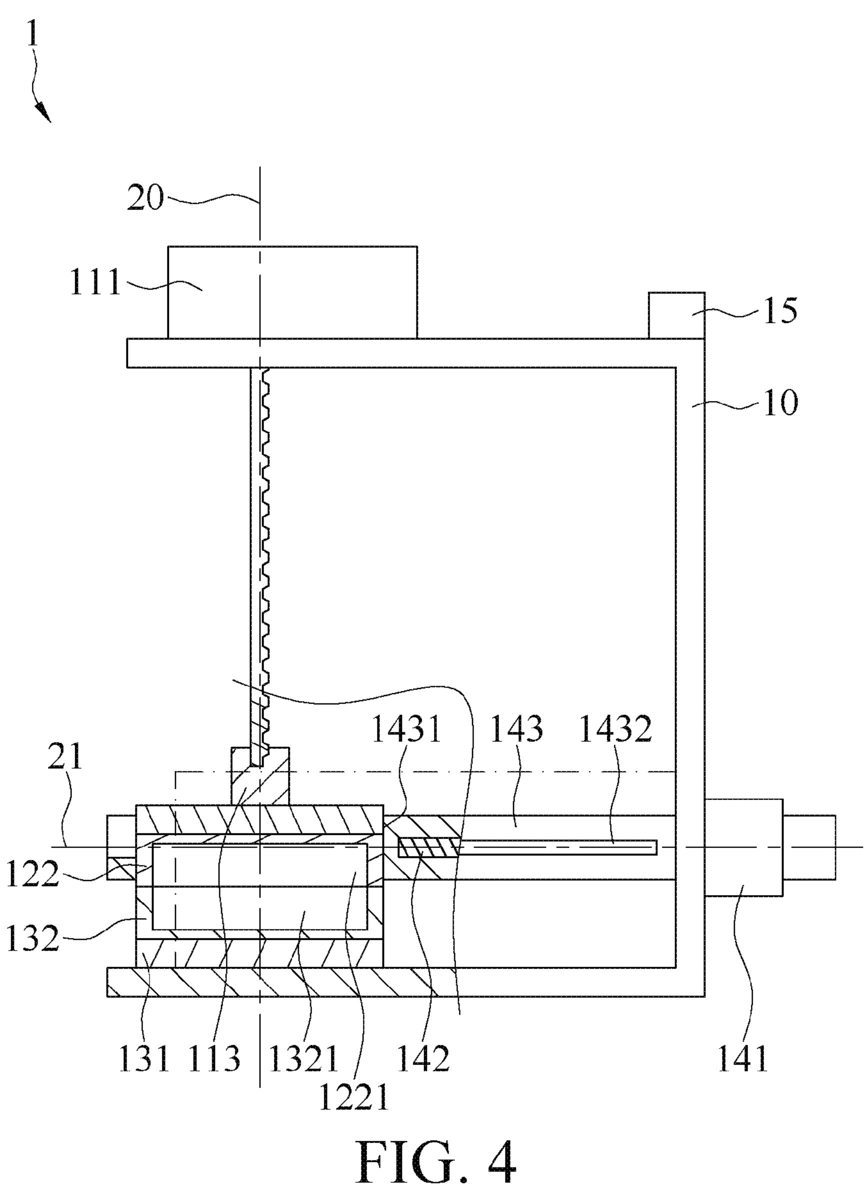
FIG. 4 is a partial side view of movement of the sandwich maker to a hot-pressing position according to an embodiment of the present invention.

Next, referring to FIG. 4, FIG. 4 is a partial side view of movement of the sandwich maker to a hot-pressing position according to the present invention. As shown in FIG. 2 to FIG. 4, the controller 15 of the sandwich maker 1 controls the first motor set 111 to drive the connecting base 113 to selectively move between an initial position (as shown in FIG. 2) and a hot-pressing position (as shown in FIG. 4). When the connecting base 113 is at the initial position (referring to FIG. 2), the pressing mold 122 and the bearing mold 132 are separated from each other and spaced apart. When the connecting base 113 is moved to the hot-pressing position (referring to FIG. 4), the pressing mold 122 passes through a hollow portion 1431 and is engaged with the bearing mold 132. Accordingly, through control logic of the foregoing controller 15, the connecting base 113 provides a sufficient space at the initial position for the conveying base 143 to feed a food material into or out of the sandwich maker 1, and the connecting base 113 performs hot pressing on the food material at the hot-pressing position.

In this embodiment, the connecting base 113 is initially located at the initial position. When the conveying base 143 conveys the food material below the pressing mold 122, the controller 15 of the sandwich maker 1 continuously controls the heating device 121 and the heating furnace 131 to maintain at a high temperature, and causes the first motor set 111 to drive the connecting base 113 to the hot-pressing position, so that hot pressing is implemented after a required heating time, such as 60 seconds or 90 seconds. Finally, the controller 15 controls the first motor set 111 to drive the connecting base 113 back to the initial position, so that hot pressing is completed.

In other embodiments, the connecting base 113 may further be moved to the hot-pressing position first, and after a short heating time, such as 3 seconds, 5 seconds, or 10 seconds, the first motor set 111 drives the connecting base 113 to the initial position. The foregoing steps are repeated several times, for example, 2 times, 3 times, and 5 times, etc. Through the foregoing process, the food material may be evenly attached to the first mold cavity 1221 and the second mold cavity 1321. Afterwards, the first motor set 111 drives the connecting base 113 to the hot-pressing position for a long time, such as 1 minute or 2 minutes, etc., so that hot pressing is implemented. Finally, the controller 15 controls the first motor set 111 to drive the connecting base 113 back to the initial position, so that hot pressing is completed.

Figure 5:
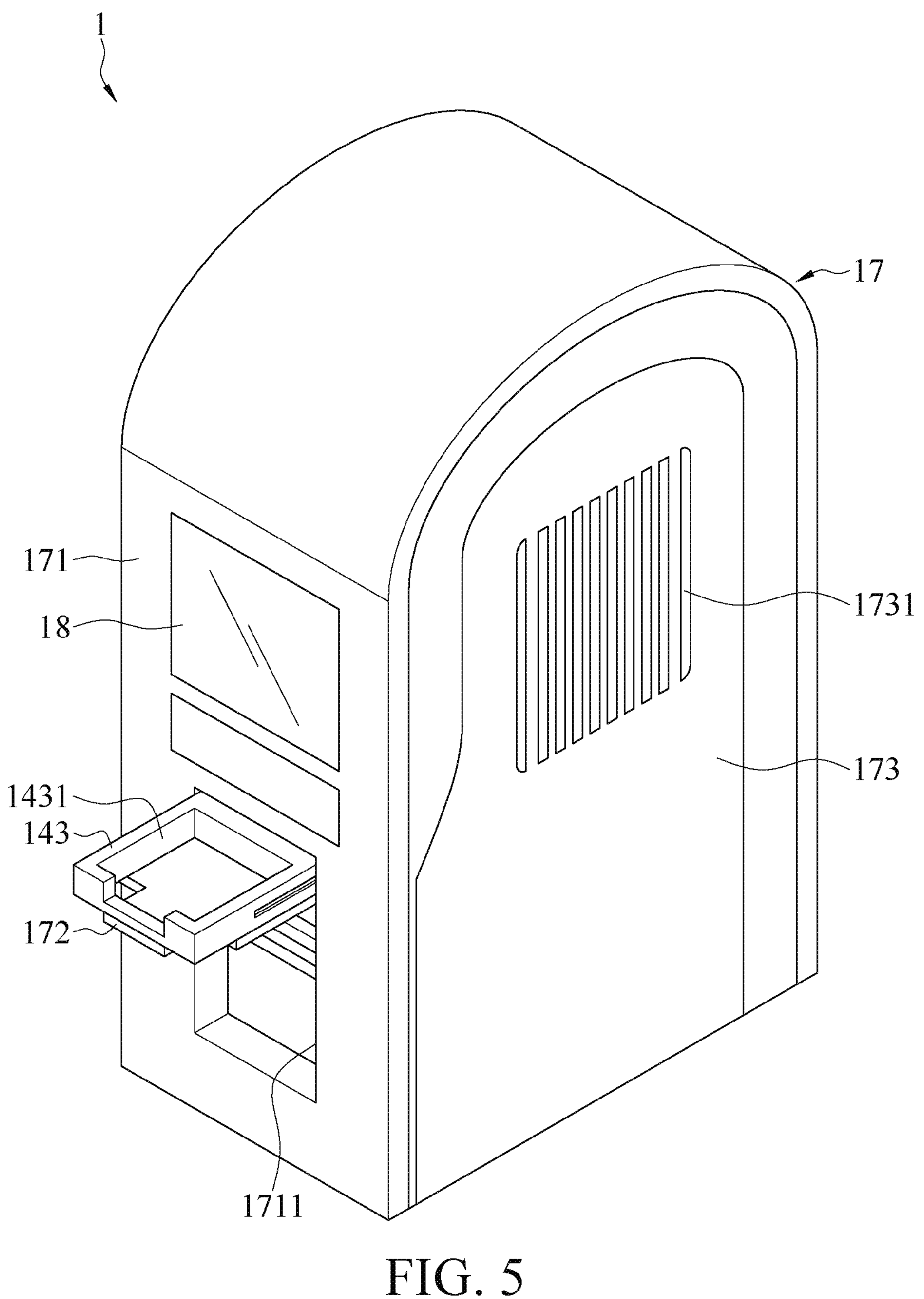
FIG. 5 is a three-dimensional view of the sandwich maker according to an embodiment of the present invention.

In addition, referring to FIG. 5, FIG. 5 is a three-dimensional view of a sandwich maker according to an embodiment of the present invention. As shown in FIG. 1, FIG. 2, and FIG. 5, the sandwich maker 1 further includes a housing 17. The housing 17 covers the support structure 10, the pressing mechanism 11, the hot-pressing structure 12, the bearing structure 13, the conveying mechanism 14, and the controller 15, to protect the foregoing structures and mechanisms through the housing 17. The housing 17 has a front housing 171 and a flat plate 172. The front housing 171 has an opening 1711, the opening 1711 corresponds to the conveying base 143, and the flat plate 172 is assembled on the front housing 171 and located at a bottom of the opening 1711. In this embodiment, the housing 17 is made of stainless steel (SUS304) and is formed by metal stamping and bolting and splicing. In some embodiments, the housing 17 may further be made of other metals, such as iron, cast iron, aluminum, or steel, etc., and spliced by metal stamping or casting, and then welding, bolt locking, or riveting. The housing may further be made of plastic and integrally made by injection molding, or spliced in a fixing method such as bolt locking, riveting, or adhesive dispensing.

As shown in FIG. 1 to FIG. 5, the controller 15 of the sandwich maker 1 controls the second motor 141 to drive the conveying base 143 to selectively move between the first position (as shown in FIG. 1, FIG. 2, and FIG. 5) and the second position (as shown in FIG. 4). When the conveying base 143 is at the first position (referring to FIG. 1, FIG. 2, and FIG. 5), the hollow portion 1431 of the conveying base 143 protrudes from the housing 17 and is located above the flat plate 172, and the user may put a food material into the hollow portion 1431 of the conveying base 143. When the conveying base 143 is at the second position (referring to FIG. 4), the hollow portion 1431 of the conveying base 143 is accommodated in the housing 17. Accordingly, the food material on the flat plate 172 is pushed to the inside of the housing 17 through an edge of the hollow portion 1431 of the conveying base 143, until the food material falls into the second cavity 1321 of the bearing mold 132, thereby automatically conveying the food material.

In addition, the food material is conveyed into the housing 17 for cooking to prevent the user from accidentally touching a heat source and being burned during heating. In this embodiment, the second motor 141 is controlled by the controller 15, so that the conveying base 143 is located at the first position. At this time, the user puts the food material into the hollow portion 1431 of the conveying base 143, and then the second motor 141 is controlled by the controller 15, so that the conveying base 143 is moved to the second position. At this time, the food material loses support of the flat plate 172 and falls into the second cavity 1321 of the lower bearing mold 132, and then the foregoing hot pressing may be implemented through the control by the controller 15.

As shown in FIG. 1 and FIG. 3, a control panel 18 connected to the controller 15 is disposed on the front housing 171 of the housing 17, so that the user may operate the controller 15 through the control panel 18, and causes a control interface of the sandwich maker 1 to be humanized by selecting a desired hot pressing method or length of time.

Next, as shown in FIG. 5, a side housing 173 of the housing 17 has a plurality of heat dissipation holes 1731, so that heat generated by the first motor set 111, the second motor 141, the heating device 121, and the heating furnace 131 during operation may be conducted via the air through the heat dissipation holes 1731 to the outside of the housing 17, thereby improving product safety and availability and beautifying a product shape. In this embodiment, the heat dissipation hole 1731 is formed integrally with the side housing 173 through metal stamping.

Figure 6:
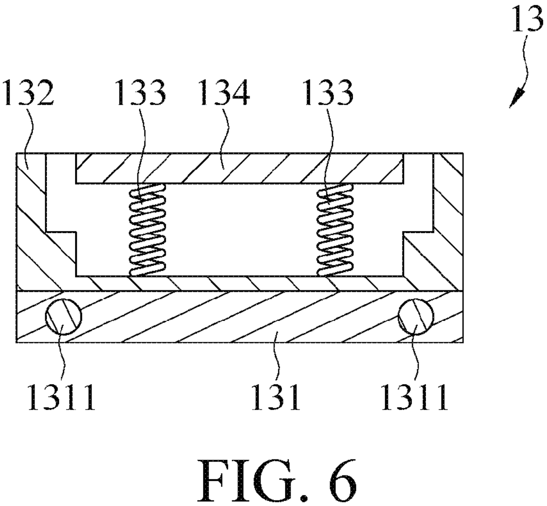
FIG. 6 is a section view of a bearing structure of the sandwich maker according to an embodiment of the present invention.

FIG. 6 is a section view of a bearing structure of the sandwich maker according to an embodiment of the present invention. In this embodiment, it can be seen from FIG. 2 that because the bearing mold 132 of the bearing structure 13 is very close to the conveying base 143 of the conveying mechanism 14, a hot-pressed food material may be pushed up through a periphery of the conveying base 143 to be away from the bearing mold 132 and transported to the flat plate 172. However, in order to further cause the hot-pressed dish to be more smoothly detached from the bearing mold 132 and return to a height in which the conveying base 143 may easily push the food material up, as shown in FIG. 6, the bearing structure 13 of the sandwich maker 1 further includes an elastic member 133 and a pushing member 134. It should be noted that, for description of an overall structure, a detailed structure shown in FIG. 6 is omitted in FIG. 2 and FIG. 4.

The elastic member 133 is disposed on the bearing mold 132, and the pushing member 134 is disposed on the elastic member 133. Accordingly, when hot pressing is completed on the food material, the connecting base 113 returns to the initial position from the hot-pressing position, and a restoring force accumulated by the elastic member 133 compressed and deformed during the hot pressing drives the pushing member 134 to push the dish back to a height before the hot pressing, so that the conveying base 143 can push the dish back to the flat plate 172 by using the pushing member 134 and conveyed to the outside of the housing 17 for the user to enjoy, thereby causing the product more to be humanized. In this embodiment, the pushing member 134 is a stainless steel sheet, and the elastic member 133 is a plurality of springs fixed between the pushing member 134 and the bearing mold 132 by welding.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. A sandwich maker, comprising:

a support structure comprises a top cover, a receiving portion, and a base, the receiving portion being located between the top cover and the base;

a pressing mechanism disposed on the support structure and comprising a first motor set, a first transmission rod, and a connecting base, wherein the first transmission rod is connected to the first motor set, the connecting base is connected to the first transmission rod, and the connecting base performs linear reciprocating motion driven by the first motor set and the first transmission rod;

a hot-pressing structure fixed to the connecting base and comprising a heating device and a pressing mold, wherein the pressing mold is connected to the connecting base, the heating device is disposed between the connecting base and the pressing mold, and the pressing mold has a first mold cavity;

a bearing structure fixed to the support structure, wherein the bearing structure comprises a heating furnace and a bearing mold, the heating furnace being correspondingly disposed below the hot-pressing structure, and the bearing mold being disposed above the heating furnace and having a second mold cavity;

a conveying mechanism comprising a second motor, a second transmission rod, and a conveying base, wherein the second motor is fixed to the support structure, the second transmission rod is connected to the second motor, the conveying base is connected to the second transmission rod and performs linear reciprocating motion along a second direction driven by the second motor and the second transmission rod, the first direction being perpendicular to the second direction;

a controller disposed on the support structure and electrically connected to the first motor set, the second motor, the heating device, and the heating furnace, to control operation of the first motor set, the second motor, the heating device, and the heating furnace;

a housing, wherein the housing covers the support structure, the pressing mechanism, the hot-pressing structure, the bearing structure, the conveying mechanism, and the controller, and the housing has a front housing and a flat plate, the front housing having an opening corresponding to the conveying base, and the flat plate being assembled on the front housing and located at a bottom of the opening; and two guide rods, wherein the two guide rods are fixed between the top cover and the base, and are disposed in parallel with the first transmission rod, and the connecting base is inserted between the two guide rods and moves along an axial direction parallel with the first transmission rod under restriction and guidance by the two guide rods;

wherein the bearing structure further comprises an elastic member and a pushing member, the elastic member being disposed on the bearing mold, and the pushing member being disposed on the elastic member;

wherein the controller controls the second motor to drive the conveying base to selectively move between a first position and a second position; when the conveying base is at the first position, a hollow portion of the conveying base protruding from the housing and being located above the flat plate; and when the conveying base is at the second position, the hollow portion of the conveying base being accommodated in the housing.

2. The sandwich maker according to claim 1, wherein the first motor set being fixed to the top cover, the heating furnace being disposed on the base, and the second motor being fixed to the receiving portion.

3. The sandwich maker according to claim 2, wherein the receiving portion has a first guide structure, and the conveying base comprises a second guide structure, the second guide structure matching the first guide structure to cause the second guide structure to perform linear motion under guidance of the first guide structure.

4. The sandwich maker according to claim 3, wherein the first guide structure is a sliding rail and the second guide structure is a sliding groove.

5. The sandwich maker according to claim 3, wherein the first guide structure is a sliding groove and the second guide structure is a sliding rail.

6. The sandwich maker according to claim 1, wherein the controller controls the first motor set to drive the connecting base to selectively move between an initial position and a hot-pressing position; when the connecting base is at the initial position, the pressing mold and the bearing mold being away from each other and spaced apart; and when the connecting base is moved to the hot-pressing position, the pressing mold passing through a hollow portion of the conveying base and being engaged with the bearing mold.

7. The sandwich maker according to claim 1, wherein a control panel is disposed on the front housing and is connected to the controller.

8. The sandwich maker according to claim 1, wherein the housing has a side housing having a plurality of heat dissipation holes.

* * * * *